(12) United States Patent
Takeda et al.

(10) Patent No.: US 8,183,835 B2
(45) Date of Patent: May 22, 2012

(54) BATTERY PACK

(75) Inventors: Takashi Takeda, Atsugi (JP); Junji Takeshita, Atsugi (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 647 days.

(21) Appl. No.: 12/369,028

(22) Filed: Feb. 11, 2009

(65) Prior Publication Data

US 2009/0202890 A1    Aug. 13, 2009

(30) Foreign Application Priority Data

Feb. 12, 2008   (JP) ................................. 2008-030760

(51) Int. Cl.
*H02J 7/00*    (2006.01)

(52) U.S. Cl. ......... 320/134; 320/112; 320/135; 320/136

(58) Field of Classification Search .......... 320/134–136, 320/150

See application file for complete search history.

(56) References Cited

U.S. PATENT DOCUMENTS

| 5,890,780 | A | * | 4/1999 | Tomiyori | ........................ | 307/86 |
| 2009/0072790 | A1 | * | 3/2009 | Ibrahim | ........................ | 320/134 |

FOREIGN PATENT DOCUMENTS

| JP | 05-049181 | 2/1993 |
| JP | 2003-153435 | 5/2003 |
| JP | 2004-152580 | 5/2004 |

OTHER PUBLICATIONS

Machine translation of Korean office action mailed.*
Korean Office Action mailed Feb. 7, 2011.

* cited by examiner

*Primary Examiner* — Samuel Berhanu
(74) *Attorney, Agent, or Firm* — IPUSA, PLLC

(57) ABSTRACT

A battery pack including a protection circuit configured to detect over-charge, over-discharge and over-current of a rechargeable battery to turn off a switch element, the switch element provided at a wire provided between the rechargeable battery and a load circuit or a charging device; a series circuit of a thermistor and a resistor, the series circuit provided in parallel to the rechargeable battery, the thermistor thermally connected to the rechargeable battery; and an abnormal temperature detection unit provided in the protection circuit, wherein the abnormal temperature detection unit operates the switch to be in an off state when the temperature of the rechargeable battery is higher than a predetermined temperature, and when a voltage of the wire is higher than a threshold voltage of a forward drop voltage of a body diode in the switch, the abnormal temperature detection unit operates the switch to be in an on state.

3 Claims, 7 Drawing Sheets

BATTERY PACK

BACKGROUND OF THE INVENTION

1. Field of the Invention

The present invention generally relates to a battery pack, and more specifically, to a battery pack which includes a rechargeable battery and a protection circuit which, upon detection of an over-charge, over-discharge or over-current of the rechargeable battery, operates a switch on a wire provided between the rechargeable battery and a load circuit or a charging device to be in an off state.

2. Description of the Related Art

Recently, lithium ion batteries have been provided as rechargeable batteries for use in portable apparatuses such as digital cameras or the like. Since lithium ion batteries can be damaged by use under over-charge conditions or over-discharge conditions, lithium ion batteries have been provided for use in battery packs that include protection circuits for over-charge conditions or over-discharge conditions.

FIGS. 1 and 2 show block diagrams of battery packs of the related art. In FIG. 1, it is shown that a series circuit of a resistor R1 and a capacitor C1 is connected in parallel to a lithium battery 2. An anode of the lithium battery 2 is connected to an external terminal 3 of the battery pack 1, and a cathode of the lithium battery 2 is connected to an external terminal 4 via N-type MOS (Metal-Oxide Semiconductor) transistors M1 and M2, which are used for limiting a current.

Drains (electrodes) of the MOS transistors M1 and M2 are connected in common, a source (electrode) of the transistor MOS M1 is connected to the cathode of the lithium ion battery 2 and a source of the transistor MOS M2 is connected to the external terminal 4 of the battery pack 1. Also, body diodes (parasitic diodes) D1 and D2, respectively, are connected between the source and drain of the MOS transistors M1 and M2.

A protection IC (Integrated Circuit) 5 includes an overcharge detection circuit, an over-discharge detection circuit, and an over-current detection circuit. For operation of the protection IC 5, power Vdd is supplied from the anode of the lithium ion battery 2 to the protection IC 5 via the resistor R1, and power Vss is supplied from the cathode of the lithium ion battery 2 to the protection IC 5.

As for the protection IC 5, when the over-discharge detection circuit or the over-current detection circuit detects, respectively, an over-discharge state or an over-current state, the protection IC 5 sets an output of DOUT to be at a low level causing the MOS transistor M1 to be in a cut-off state. When the overcharge detection circuit detects an overcharge state, the protection IC 5 sets an output of COUT to be at a low level causing the MOS transistor M2 to be in a cut-off state.

In the example shown in FIG. 2, the battery pack 1 includes a thermistor R3. One of the terminals of the thermistor R3 is connected to a terminal 6 of the battery pack 1 and the other terminal is connected to the external terminal 4. When being charged, a predetermined voltage is applied to the terminal 6 of the battery pack 1 via a divided resistance with a charging device. The voltage of the terminal 6 is varied as the resistance of the thermistor R3 changes according to temperature of the battery pack 1. The charging device detects the voltage (indicating a temperature of the battery pack 1) of the terminal 6, and if the temperature (indicated by the voltage) of the battery pack 6 is greater than a predetermined value, the charging device performs operations to stop charging the battery pack 1.

Further, in Japanese Patent Application Publication No. 2004-152580, it is described that a series connection of a diode and a temperature control element (PTC element: positive temperature coefficient element) is made for a rechargeable battery and another diode is connected to the rechargeable battery in parallel to and in a direction reverse to the PTC element. This configuration is made to prevent the PTC element from operating under a normal discharge condition of the rechargeable battery even if the temperature of the rechargeable battery is high.

The related art example of FIG. 1 does not include a temperature protection function for the battery pack 1. On the other hand, the related art example of FIG. 2 shows a temperature protection function for the battery pack 1. In this case, since a predetermined voltage is applied to the battery pack 1 via the divided resistance from the charging device, there may be a problem in that the temperature of the battery pack 1 cannot be detected accurately when the predetermined voltage of the charging device is varied or when the divided resistance includes tolerance.

SUMMARY OF THE INVENTION

This invention takes into consideration the issues above. One of the objects of this invention may be to provide a battery pack which can accurately perform a temperature protection function of a rechargeable battery and prevent self-heating of the rechargeable battery during discharging only when a charging device is connected.

Accordingly, embodiments of the present invention may provide a novel and useful solution for one or more of the problems discussed above. More specifically, the embodiments of the present invention may provide a battery pack, including a protection circuit configured to detect overcharge, over-discharge and over-current of a rechargeable battery in order to turn off a switch element, the switch element being provided at a wire provided between the rechargeable battery and a load circuit or between the rechargeable battery and a charging device; a series circuit of a thermistor and a resistor, the series circuit being provided in parallel to the rechargeable battery, the thermistor being thermally connected to the rechargeable battery; and an abnormal temperature detection unit provided in the protection circuit, wherein the abnormal temperature detection unit operates the switch to be in an off state in a case where a temperature of the rechargeable battery detected by the thermistor is higher than a predetermined temperature, and in a case where a voltage of the wire provided between the rechargeable battery and the load circuit or between the rechargeable battery and the charging device is higher than a threshold voltage of a forward drop voltage of a body diode in the switch, the abnormal temperature detection unit operates the switch to be in an on state.

Another aspect of the embodiments of the present invention may provide a battery pack including a protection circuit configured to detect over-charge, over-discharge and over-current of a rechargeable battery in order to turn off a switch element, the switch element being provided at a wire provided between the rechargeable battery and a load circuit or between the rechargeable battery and a charging device; a series circuit of a thermistor and a resistor, the series circuit being provided in parallel to the rechargeable battery, the thermistor being thermally connected to the rechargeable battery; and means for operating the switch to be in an off state or an on state, wherein the means for operating the switch operates the switch to be in an off state in a case where a temperature of the rechargeable battery detected by the thermistor is higher than a predetermined temperature, and in a case where a voltage of the wire provided between the rechargeable battery and the load circuit or the charging device is higher than a threshold voltage of a forward drop voltage of a body diode in the switch, the means for operating the switch operates the switch to be in an on state.

Other objects, features, and advantages of the present invention will become more apparent from the following detailed description when read in conjunction with the accompanying drawings.

According to the embodiment of this invention, it becomes possible to provide a battery pack which can accurately perform a temperature protection of a rechargeable battery and prevent self-heating of the rechargeable battery during discharging only when a charging device is connected.

DETAILED DESCRIPTION OF THE PREFERRED EMBODIMENTS

Figure 1:
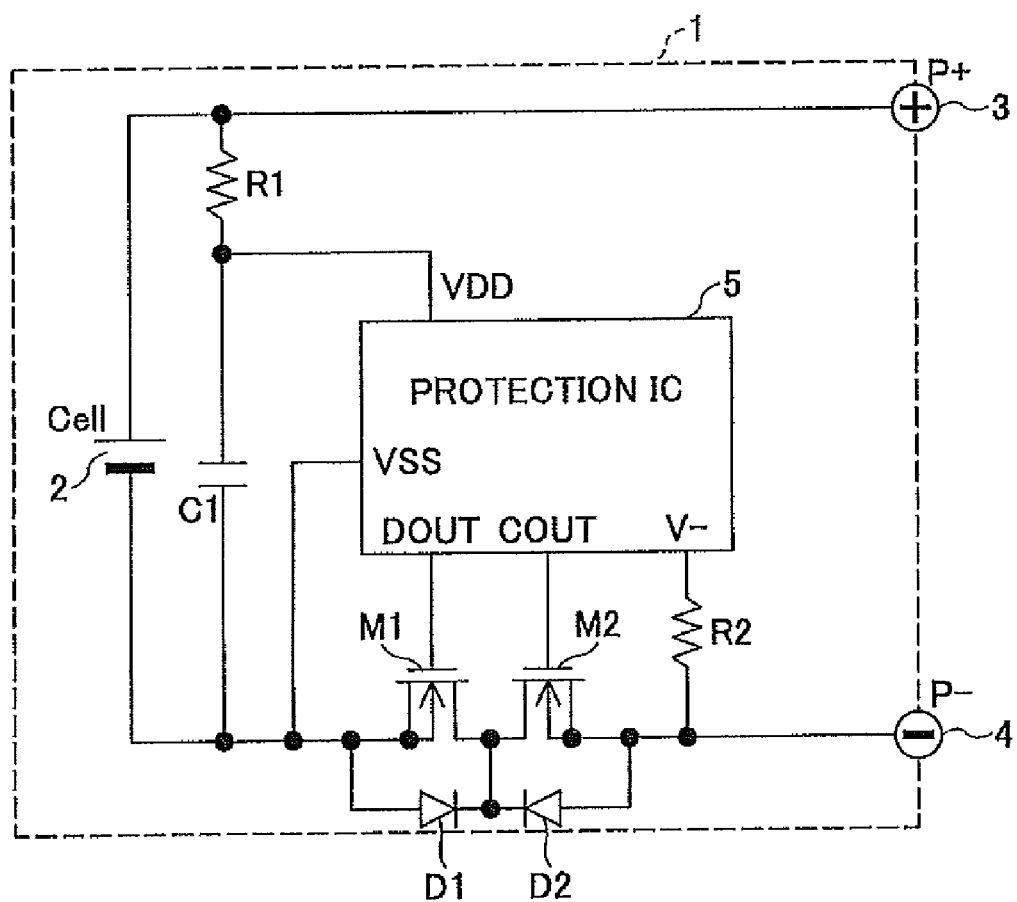
FIG. 1 is a block diagram showing an example of a battery pack of the related art.
Figure 2:
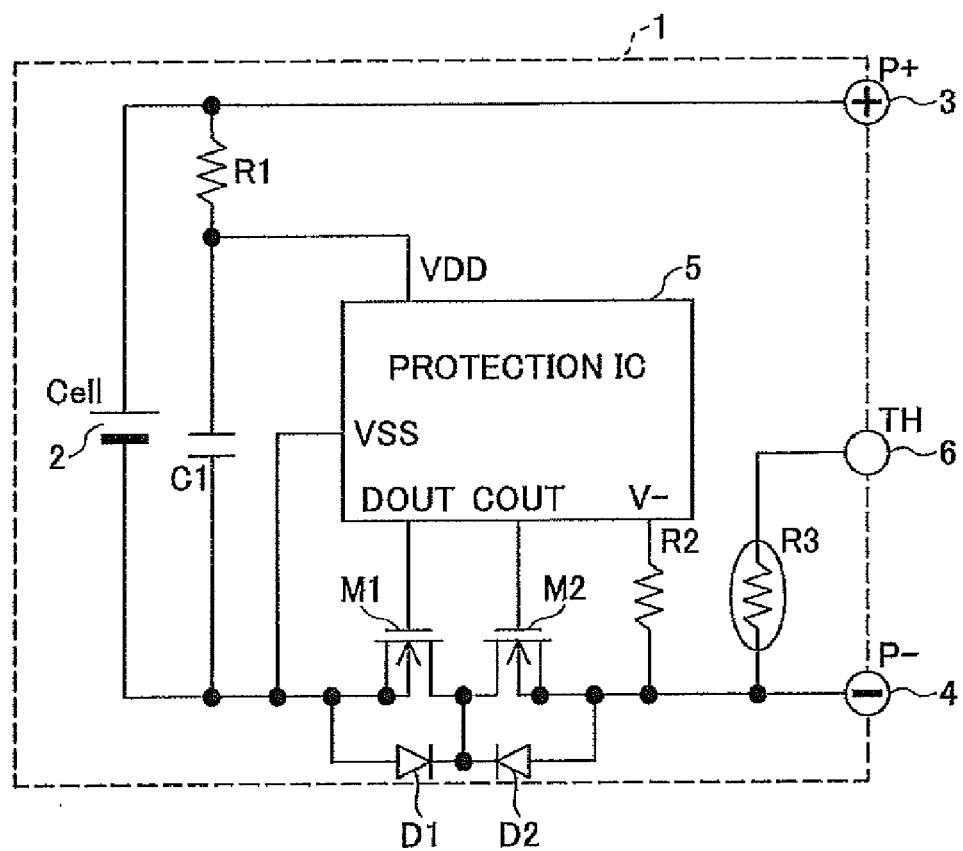
FIG. 2 is a block diagram showing another example of a battery pack of the related art.
Figure 3:
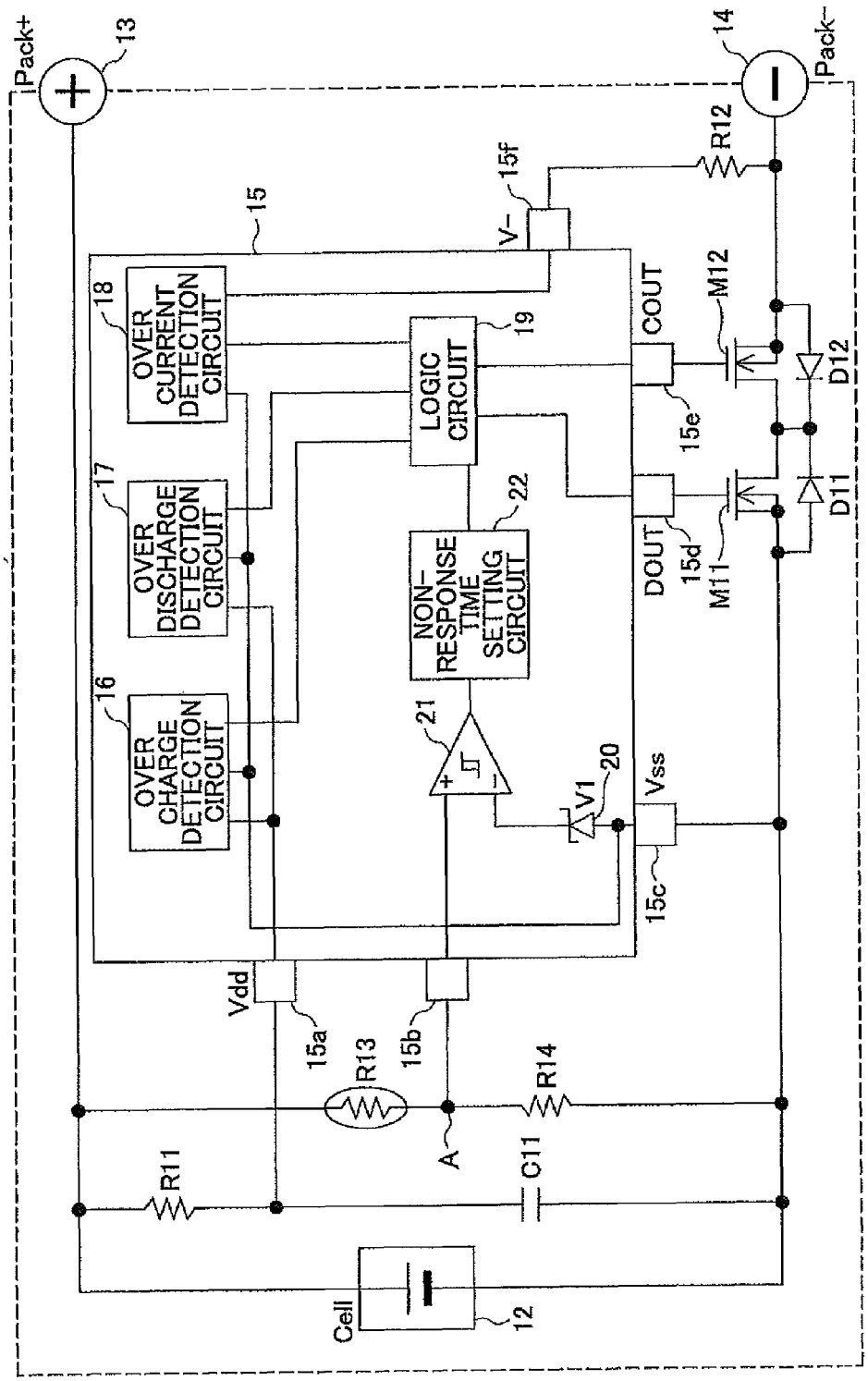
FIG. 3 is a block diagram of a reference example of a battery pack of the present invention.

FIG. 3 is a block diagram of a reference example of a battery pack of the present invention. In FIG. 3, a series circuit of a resistor R11 and a capacitor C11 is connected in parallel to a lithium ion battery 12 (cell 12). An anode of the lithium ion battery 12 is connected to an external terminal 13 of a battery pack 10 via a wire, and a cathode of the lithium ion battery 12 is connected, with a wire, to an external terminal 14 of the battery pack 10 via N-channel MOS transistors M11 and M12 which are used for limiting current.

A drain of the MOS transistor M11 and a drain of the MOS transistor M12 are connected in common. A source of the MOS transistor M11 is connected to the cathode of the lithium ion battery 12 and the source of the MOS transistor M12 is connected to the external terminal 14 of the battery pack 10. Further, body diodes D11 and D12, respectively, are equivalently connected between the sources and the drains of the MOS transistors M11 and M12.

Further, a series circuit including a thermistor R13 and a resistor R14 is connected in parallel to the lithium ion battery 12. The thermistor R13 is included in the battery pack 10 and placed near the lithium ion battery 12 in a manner such that heat is transferred from the battery 12 and through the thermistor R13 (the thermistor R13 being thermally connected to the battery 12). An NTC thermistor (Negative Temperature Coefficient thermistor) is used for the thermistor R13.

Figure 4:
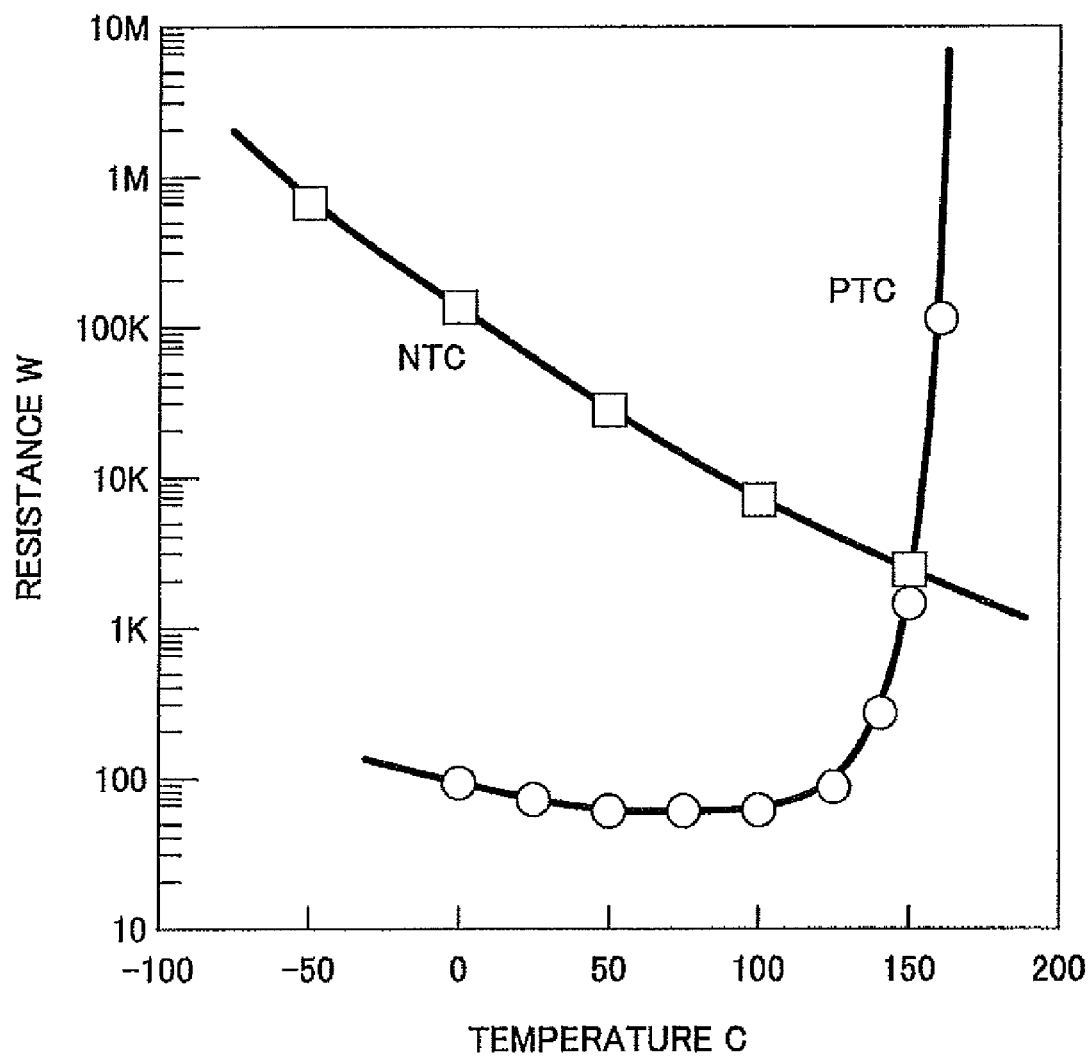
FIG. 4 is a graph showing temperature-resistance characteristics of an NTC thermistor and a PTC thermistor.

Further, FIG. 4 shows temperature-resistance characteristics of the NTC thermistor having a negative temperature coefficient and a PTC (Positive Temperature Coefficient) thermistor having a positive temperature coefficient.

A protection IC 15 internally includes an over-charge detection circuit 16, an over-discharge detection circuit 17, and an over-current detection circuit 18. Further, the protection circuit 15 operates with power Vdd supplied from an anode of the lithium ion battery 12 to a terminal 15a via a resistor R11, and also with power Vss supplied from a cathode of the lithium ion battery 12 to a terminal 15c.

The over-charge detection circuit 16 detects an over-charge state of the lithium ion battery 12 with a voltage between terminals 15a and 15c, and provides an over-charge detection signal to a logic circuit 19. The over-discharge detection circuit 17 detects an over-discharge state of the lithium ion battery 12 with a voltage between terminals 15a and 15c, and provides an over-discharge detection signal to the logic circuit 19. The over-current detection circuit 18 detects a voltage between the terminal 15c and a terminal 15f indicating whether a current flow through a resistor R12 is an excess current, and provides an over-current detection signal to the logic circuit 19.

Further, the terminal 15b of the protection IC 15 is connected to a connection node A between the thermistor R13 and the resistor R14. One of the terminals of the resistor R12 is connected to the terminal 15f and the other terminal of the resistor R12 is connected to the external terminal 14. Further, a terminal 15d of a DOUT output of the protection IC 15 is connected to a gate of the MOS transistor M11, and a terminal 15e of a COUT output of the protection IC 15 is connected to a gate of the MOS transistor M12.

As for the protection IC 15, the terminal 15b is connected to a non-inverting input terminal of a comparator 21. The terminal 15c is connected to a cathode of a constant-voltage source 20 such as a zener diode, and an anode of the constant-voltage source 20 is connected to an inverting input terminal of the comparator 21.

The thermistor R13 is an NTC thermistor which has a negative temperature coefficient as shown in FIG. 4, and thus the resistance of the thermistor R13 decreases as temperature rises. This results in an increase of the voltage of the connection node A.

The comparator 21, which has hysteresis characteristics, compares a constant voltage V1 generated by the constant-voltage source 20 with the voltage of the connection node A. If the voltage of the connection node A is higher than the constant voltage V1, the comparator outputs a high level signal. Namely, if a temperature detected by the thermistor R13 is above a predetermined temperature (for example, approximately 70° C.) corresponding to the constant voltage V1, the comparator 21 outputs a high level signal corresponding to a high temperature detection signal.

The high temperature detection signal output by the comparator 21 is provided to a non-response time setting circuit 22. The non-response time setting circuit 22 provides the logic circuit 19 with a high level signal indicating a high temperature detection signal, if the high level signal indicating the high temperature detection signal continues over a predetermined time period (for example, 0.5 seconds).

Detection signals respectively from the over-charge detection circuit 16, the over-discharge detection circuit 17 and the over-current detection circuit 18, are provided to the logic circuit 19. In addition, a high temperature detection signal output by the non-response time setting circuit 22 is provided to the logic circuit 19.

Under a normal charging condition or a normal discharging condition, the logic circuit 19 outputs high level signals to both the terminals 15d and 15e for causing the MOS transistors M11 and M12 to be electrically conductive. Further, when receiving an over-charge detection signal from the over-charge detection circuit 16, the logic circuit 19 causes the COUT output of the terminal 15e to be at a low level so that the MOS transistor M12 switches to a cut-off state. When receiving an over-discharge detection signal from the over-discharge detection circuit 17, the logic circuit 19 causes the DOUT output of the terminal 15d to be at a low level so that the MOS transistor M11 switches to a cut-off state. When receiving an over-current detection signal from the over-current detection circuit 18, the logic circuit 19 causes the DOUT output of the terminal 15d to be at a low level so that the MOS transistor M11 switches to a cut-off state.

When a high temperature detection signal becomes a high level, the logic circuit 19 causes the COUT output of the terminal 15e to be at a low level so that the MOS transistor M12 switches to a cut-off state. Thus, the temperature of the lithium ion battery 12 can be detected accurately, and it becomes possible to protect the lithium ion battery 12 by stopping a charging operation if the temperature of the lithium ion battery 12 becomes too high.

Further, as indicated in FIG. 4, the thermistor R13 can accurately detect temperature because an NTC thermistor, whose resistance approximately linearly changes as a function of temperature, is used. By placing the thermistor R13 near the lithium ion battery 12 in the battery pack 10, the temperature of the lithium ion battery 12 can be detected accurately. On the other hand, as for the PTC thermistor, the resistance starts increasing at a very high rate at a certain temperature, and thus the PTC thermistor cannot detect temperatures accurately.

If the MOS transistor M12 is in a cut-off state by setting the COUT output to be at a low level and a load circuit is connected between the external terminals 13 and 14 (charging state with connection of a load circuit), since the DOUT output is at a high level and the MOS transistor M11 is in an ON state, the body diode D12 of the MOS transistor 12 is in an ON state, so that a discharge current flows from the lithium ion battery 12 to the load circuit connected between the external terminals 13 and 14.

When assuming that a forward voltage drop of the body diode D12 is Vf and the discharge current is Id, heat is generated at a power Wd, which is expressed by an equation, Wd=Vf×Id. This may cause the battery pack 10 to generate additional heat. A description is given in the following as a way to prevent such self-heating.

Figure 5:
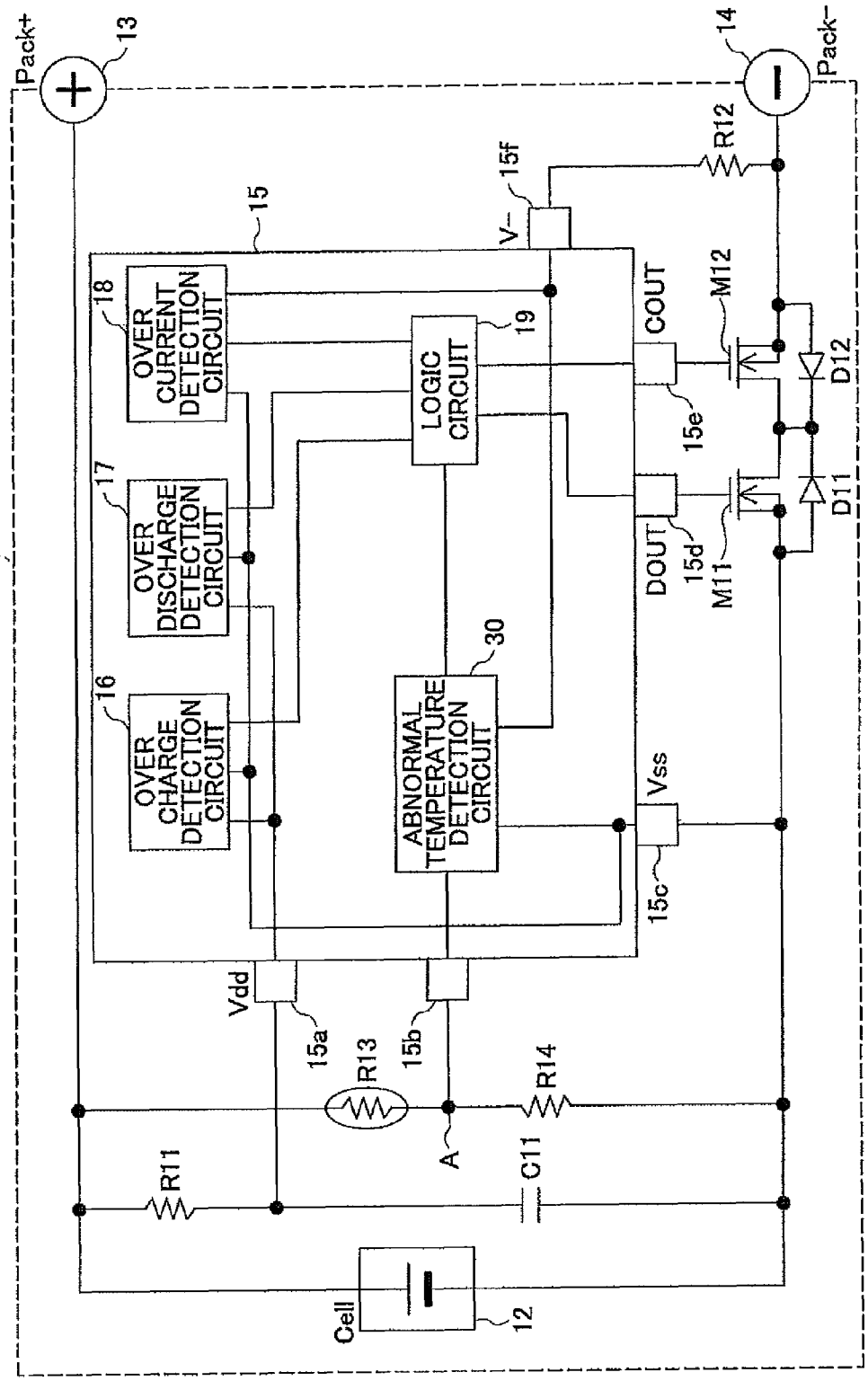
FIG. 5 is a block diagram of a battery pack according to one of the embodiments of the present invention.

FIG. 5 is a block diagram showing an example of this embodiment. As for FIG. 5, for parts similarly used in FIG. 3, the same symbols used in FIG. 3 will be used for the corresponding parts.

In FIG. 5, a series circuit of a resistor R11 and a capacitor C11 is connected in parallel to a lithium ion battery 12 (cell 12). An anode of the lithium battery 12 is connected to an external terminal 13 of a battery pack 10, and a cathode of the lithium battery 12 is connected to an external terminal 14 of the battery pack 10 via N-channel MOS transistors M11 and M12 which are used for limiting current.

A drain of the MOS transistor M11 and a drain of the MOS transistor M12 are connected in common. A source of the MOS transistor M11 is connected to the cathode of the lithium ion battery 12 and the source of the MOS transistor M12 is connected to the external terminal 14 of the battery pack 10. Further, body diodes D11 and D12, respectively, are equivalently connected between the sources and the drains of the MOS transistors M11 and M12.

Further, a series circuit including a thermistor R13 and a resistor R14 is connected in parallel to the lithium ion battery 12. The thermistor R13 is included in the battery pack 10 and placed near the lithium ion battery 12 in a manner such that heat is transferred from the battery 12 and through the thermistor R13 (the thermistor R13 being thermally connected to the battery 12). An NTC thermistor is used for the thermistor R13.

Further, FIG. 4 shows temperature-resistance characteristics of the NTC thermistor having a negative temperature coefficient and a PTC thermistor having a positive temperature coefficient.

A protection IC 15 internally includes an over-charge detection circuit 16, an over-discharge detection circuit 17, and an over-current detection circuit 18. Further, the protection circuit 15 operates with power Vdd supplied from an anode of the lithium ion battery 12 to a terminal 15a via a resistor R11, and also power Vss supplied from a cathode of the lithium ion battery 12 to a terminal 15c.

The over-charge detection circuit 16 detects an over-charge state of the lithium ion battery 12 with a voltage between terminals 15a and 15c, and provides an over-charge detection signal to a logic circuit 19. The over-discharge detection circuit 17 detects an over-discharge state of the lithium ion battery 12 with a voltage between terminals 15a and 15c, and provides an over-discharge detection signal to the logic circuit 19. The over-current detection circuit 18 detects a voltage between the terminal 15c and a terminal 15f indicating whether a current flow through a resistor R12 is an excess current, and provides an over-current detection signal to the logic circuit 19.

Further, the terminal 15b of the protection IC 15 is connected to a connection node A between the thermistor R13 and the resistor R14. One of the terminals of the resistor R12 is connected to the terminal 15f and the other terminal of the resistor R12 is connected to the external terminal 14. Further, a terminal 15d of a DOUT output of the protection IC 15 is connected to a gate of the MOS transistor M11, and a terminal 15e of a COUT output of the protection IC 15 is connected to a gate of the MOS transistor M12.

Figure 6:
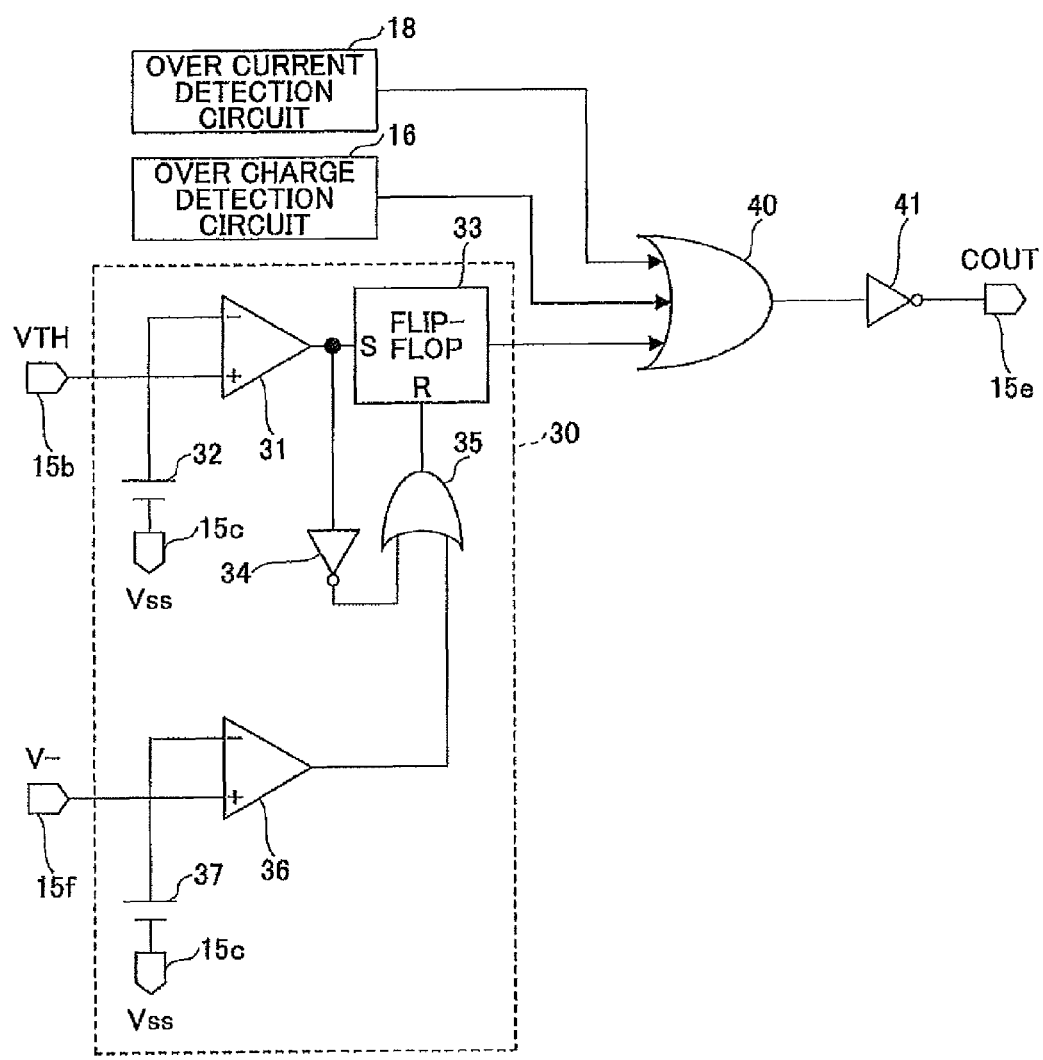
FIG. 6 is a circuit configuration of an abnormal temperature detection circuit according to one of the embodiments of the present invention.

As for the protection IC 15, the terminals 15b, 15c, and 15f are connected to an abnormal temperature detection circuit 30. FIG. 6 is a circuit configuration showing the abnormal temperature detection circuit 30 according to an example of this embodiment. In FIG. 6, the terminal 15b is connected to a non-inverting input terminal of a comparator 31. The terminal 15c is connected to a cathode of a constant-voltage source 32 such as a zener diode. An anode of the constant-voltage source 32 is connected to an inverting input terminal of the comparator 31. The thermistor R13 is an NTC thermistor which has a negative temperature coefficient as shown in FIG. 4, and thus the resistance of the thermistor R13 decreases as temperature rises. This results in an increase of the voltage of the connection node A.

The comparator 31, which has hysteresis characteristics, compares a constant voltage V1 generated by the constant-voltage source 32 with the voltage of the connection node A. If the voltage of the connection node A is higher than the constant voltage V1, the comparator outputs a high level signal. Namely, if a temperature detected by the thermistor R13 is above a predetermined temperature (for example, 70° C.) corresponding to the constant voltage V1, the comparator 31 outputs a high level signal corresponding to a high temperature detection signal. The high temperature detection signal is provided to a set terminal S of a flip-flop 33, inverted by an inverter 34 and provided to an OR circuit 35.

The terminal 15f is connected to a non-inverting input terminal of a comparator 36. The terminal 15c is connected to a cathode of a constant-voltage source 37 such as a zener diode, and an anode of the constant-voltage source 37 is connected to an inverting input terminal of the comparator 36.

When the MOS transistor M12 is in an ON state, the voltage of the terminal 15*f* is 0 V. When the MOS transistor M12 is in an OFF state and the body diode D12 switches to an ON state, the voltage of the terminal 15*f* is raised by the forward voltage drop Vf (approximately 0.7 V) of the body diode D12.

The comparator 36 compares the voltage of the terminal 15*f* with a constant voltage V2 (for example, approximately 0.4 V) generated by the constant voltage source 37, detects that the body diode D12 switches to an ON state, generates a high level signal, and then provides the high level signal to the OR circuit 35. When the high temperature detection signal switches to a low level or when it is detected that the body diode D12 switches to an ON state, the OR circuit 35 generates a high level signal and provides the high level signal to a reset terminal R of the flip-flop 33.

After the flip-flop 33 receives a high temperature detection signal at a high level and then a reset signal, between which time the flip-flop 33 outputs an abnormal temperature signal, the output signal is provided to the OR circuit 40 constituting part of the logic circuit 19.

When the over-current detection circuit 18 detects an over-current state, a high level over-current detection signal is provided to the OR circuit 40. When the over-charge detection circuit 16 detects an over-charge state, a high level over-charge detection signal is provided to the OR circuit 40. When receiving a high level over-current detection signal, a high level over-charge detection signal or a high level abnormal temperature detection signal, the OR circuit 40 outputs a high level cut-off signal. The high level cut-off signal is inverted by an inverter 41 constituting part of the logic circuit 19, and changes the COUT output of the terminal 15*c* into a low level, which causes the MOS transistor M12 to be in a cut-off state.

Additionally, the logic IC 19 sets the terminal 15*d* and 15*e* to be at a high level to switch the MOS transistors M11 and M12 into electrically conductive states while in a charging or discharging state. The logic IC 19 also sets the DOUT output of the terminal 15*d* to be at a low level for switching the MOS transistor M11 into a cut-off state after receiving an over-discharge detection signal from the over-discharge detection circuit 17. After receiving an over-current detection signal from the over-current detection circuit 18, the logic IC 19 sets the DOUT output of the terminal 15 to be at a low level for switching the MOS transistor M11 into a cut-off state.

Figure 7:
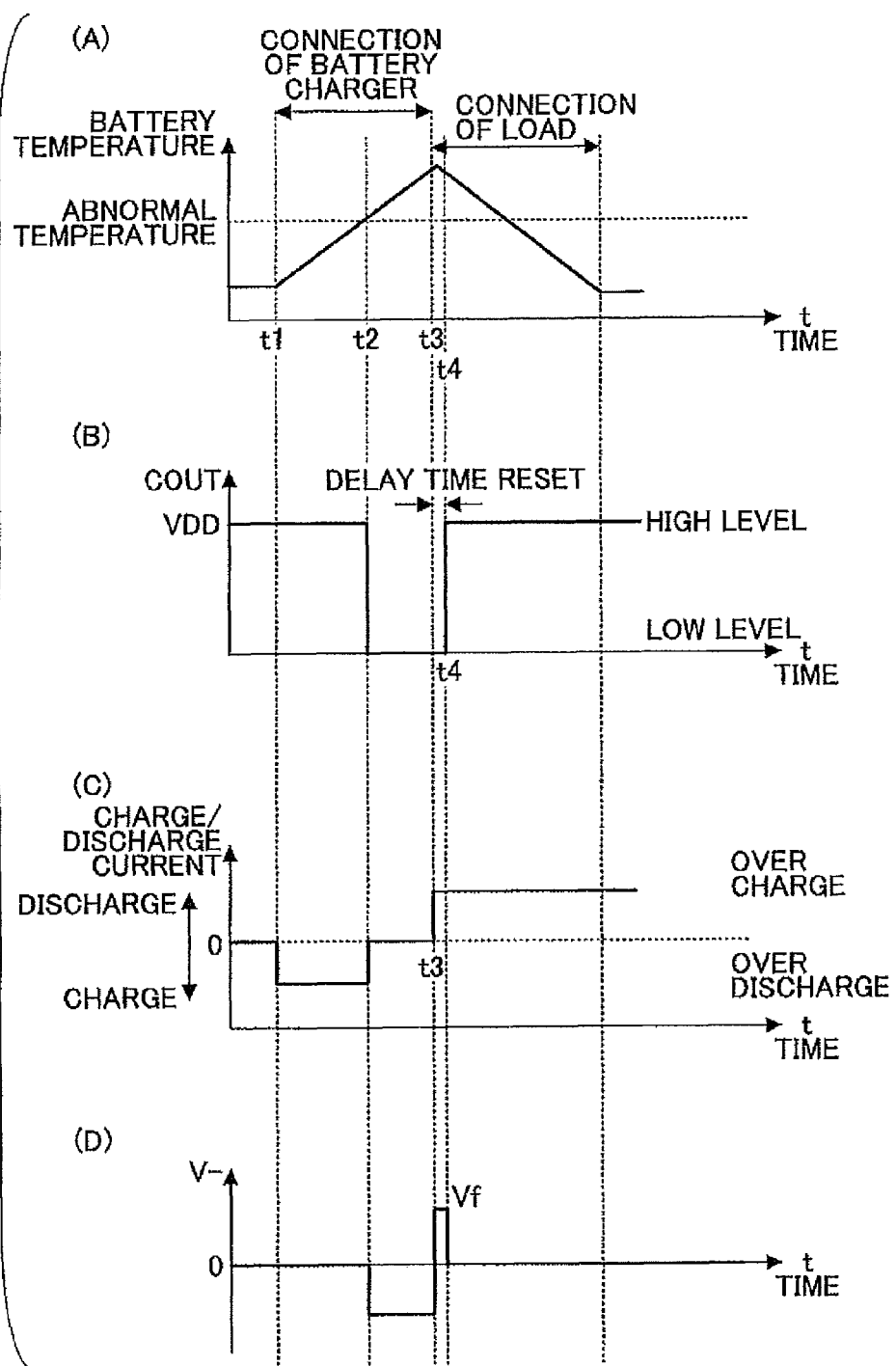
FIGS. 7(A) through 7(D) are timing charts of individual parts of FIG. 6.

When a charging device is connected to the external terminals 13 and 14 of the battery pack 10 at time t1, the COUT output of the terminal 15*e* becomes a high level as indicated in FIG. 7(B), and charging of the lithium ion battery 12 is performed as indicated in FIG. 7(C).

If the lithium ion battery 12 undergoes continued charging and the temperature of the thermistor R13 rises above a predetermined temperature at time t2 as indicated in FIG. 7(A), the comparator 31 outputs a high temperature detection signal, which is indicated by a high level, and the COUT output of the terminal 15*e* becomes a low level as indicated in FIG. 7(B). Further, the voltage of the terminal 15*f* becomes a negative voltage as shown in FIG. 7(D).

Afterward, at time t3, if a load circuit is connected to the external terminals 13 and 14 of the battery pack 10, the body diode D12 turns on (an ON state), discharging of the lithium ion battery 12 starts as indicated in FIG. 7(C), and the temperature of the thermistor R13 rises as indicated in FIG. 7(A). On the other hand, the voltage of the terminal 15*f* becomes a positive voltage (approximately 0.7 V) as indicated in FIG. 7(D), and the comparator 36 generates a reset signal with a high level at time t4.

With this, the COUT output of the terminal 15*e* becomes a high level at time t4 as indicated in FIG. 7(B) and the body diode D12 switches to an off state. This prevents the lithium ion battery 12 from self-heating, and the temperature of the thermistor R13 drops gradually as indicated in FIG. 7(A).

On the other hand, if the load circuit is connected to the external terminals 13 and 14 of the battery pack 10 without connecting the charging device, the high temperature detection signal provided to the OR circuit 40 becomes a low level. The logic circuit 19 controls the MOS transistor M12 to be in an ON state by setting the COUT output of the terminal 15*e* to be at a high level. Namely, the body diode D12 is in an OFF state, so that the battery pack 10 can be prevented from further self-heating.

Further, if both the charging device and the load circuit are connected to the external terminals 13 and 14 of the battery pack 10, the body diode D12 does not switch into an ON state even if the MOS transistor M12 is in an OFF state, because the load circuit is supplied power from the charging device.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teachings herein set forth.

This patent application is based on Japanese Priority Patent Application No. 2008-030760 filed on Feb. 12, 2008, the entire contents of which are hereby incorporated herein by reference.

What is claimed is:

1. A battery pack, comprising:
   a protection circuit configured to detect over-charge, over-discharge and over-current of a rechargeable battery in order to turn off a switch element, the switch element being provided at a wire provided between the rechargeable battery and a load circuit or between the rechargeable battery and a charging device;
   a series circuit of a thermistor and a resistor, the series circuit being provided in parallel to the rechargeable battery, the thermistor being thermally connected to the rechargeable battery; and
   an abnormal temperature detection unit provided in the protection circuit,
   wherein the abnormal temperature detection unit operates the switch to be in an off state in a case where a temperature of the rechargeable battery detected by the thermistor is higher than a predetermined temperature,
   in a case where a voltage of the wire provided between the rechargeable battery and the load circuit or between the rechargeable battery and the charging device is higher than a threshold voltage of a forward drop voltage of a body diode in the switch, the abnormal temperature detection unit operates the switch to be in an on state, and
   the abnormal temperature detection unit includes:
   a first comparator configured to compare a voltage of a connection node between the thermistor and the resistor and a reference voltage corresponding to the predetermined temperature;
   a second comparator configured to compare the voltage of the connection node and the threshold voltage of the forward drop voltage of the body diode in the switch; and
   a flip flop,
   wherein when the temperature of the rechargeable battery exceeds the predetermined temperature, the flip flop is set by an output signal of the first comparator, and when the voltage of the wire exceeds the threshold voltage, the flip flop is reset by an output signal of the second comparator.

2. The battery pack as claimed in claim 1, wherein the thermistor is an NTC thermistor having a negative temperature coefficient.

3. A battery pack, comprising:
a protection circuit configured to detect over-charge, over-discharge and over-current of a rechargeable battery in order to turn off a switch element, the switch element being provided at a wire provided between the rechargeable battery and a load circuit or between the rechargeable battery and a charging device;
a series circuit of a thermistor and a resistor, the series circuit being provided in parallel to the rechargeable battery, the thermistor being thermally connected to the rechargeable battery; and
means for operating the switch to be in an off state or an on state,
wherein the means for operating the switch operates the switch to be in an off state in a case where a temperature of the rechargeable battery detected by the thermistor is higher than a predetermined temperature,
in a case where a voltage of the wire provided between the rechargeable battery and the load circuit or between the rechargeable battery and the charging device is higher than a threshold voltage of a forward drop voltage of a body diode in the switch, the means for operating the switch operates the switch to be in an on state, and
the abnormal temperature detection unit includes:
a first comparator configured to compare a voltage of a connection node between the thermistor and the resistor and a reference voltage corresponding to the predetermined temperature;
a second comparator configured to compare the voltage of the connection node and the threshold voltage of the forward drop voltage of the body diode in the switch; and
a flip flop,
wherein when the temperature of the rechargeable battery exceeds the predetermined temperature, the flip flop is set by an output signal of the first comparator, and
when the voltage of the wire exceeds the threshold voltage, the flip flop is reset by an output signal of the second comparator.

* * * * *